US008216064B1

(12) United States Patent
Muskin

(10) Patent No.: US 8,216,064 B1
(45) Date of Patent: *Jul. 10, 2012

(54) CASINO CASHLESS TICKET IDENTIFICATION SYSTEM

(76) Inventor: Jon H. Muskin, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/852,499

(22) Filed: Aug. 8, 2010

Related U.S. Application Data

(63) Continuation of application No. 11/064,060, filed on Feb. 23, 2005, now Pat. No. 7,771,278.

(60) Provisional application No. 60/637,934, filed on Dec. 21, 2004.

(51) Int. Cl.
*A63F 13/00* (2006.01)

(52) U.S. Cl. ............................................ 463/29; 463/25

(58) Field of Classification Search ................ 463/1, 23, 463/29, 42

See application file for complete search history.

(56) References Cited

U.S. PATENT DOCUMENTS

| | | | | |
|---|---|---|---|---|
| 5,326,104 | A * | 7/1994 | Pease et al. | 463/18 |
| 5,613,912 | A * | 3/1997 | Slater | 463/25 |
| 6,048,269 | A * | 4/2000 | Burns et al. | 463/25 |
| 6,244,958 | B1 * | 6/2001 | Acres | 463/26 |
| 6,394,907 | B1 * | 5/2002 | Rowe | 463/42 |
| 6,500,067 | B1 * | 12/2002 | Luciano et al. | 463/25 |
| 6,802,778 | B1 * | 10/2004 | Lemay et al. | 463/42 |
| 6,811,486 | B1 * | 11/2004 | Luciano, Jr. | 463/24 |
| 6,863,608 | B1 * | 3/2005 | LeMay et al. | 463/24 |
| 6,866,586 | B2 * | 3/2005 | Oberberger et al. | 463/42 |
| 6,905,411 | B2 * | 6/2005 | Nguyen et al. | 463/25 |
| 6,969,319 | B2 * | 11/2005 | Rowe et al. | 463/25 |
| 7,153,206 | B2 * | 12/2006 | Bennett, III | 463/17 |
| 7,169,052 | B2 * | 1/2007 | Beaulieu et al. | 463/43 |
| 7,192,350 | B2 * | 3/2007 | Nguyen | 463/25 |
| 2004/0142750 | A1 * | 7/2004 | Glisson et al. | 463/42 |

* cited by examiner

*Primary Examiner* — Kang Hu

(74) *Attorney, Agent, or Firm* — Muskin & Cusick LLC

(57) ABSTRACT

A slot machine gaming device and method to target advertisements and promotions on cashless tickets. Players can be identified by their player's card, and a record associated with a ticket can be associated with the identified player. Upon redemption, the player, based on his or her player profile, can be presented with a targeted message and/or a special bonus offer.

11 Claims, 11 Drawing Sheets

CASINO CASHLESS TICKET IDENTIFICATION SYSTEM

CROSS REFERENCE TO RELATED APPLICATIONS

This application is a continuation application of U.S. application Ser. No. 11/064,060, now allowed, filed on Feb. 23, 2005 now U.S. Pat. No. 7,771,278, entitled "Casino Cashless Ticket Identification System" which claims benefit to U.S. provisional application 60/637,934, filed on Dec. 21, 2004, both applications of which are incorporated by reference in their entireties.

BACKGROUND OF THE INVENTION

1. Field of the Invention

The present invention is directed to a method, device, and computer readable storage medium for implementing a cashless casino promotional system. More particularly, the present invention allows for a targeted marketing to holders of cashless tickets.

2. Description of the Related Art

Cashless wagering (also known as "ticket in ticket out") has become very popular in modern casinos. Monetary tickets can replace the traditional coins used to pay and get paid when playing slot machines.

What is needed is a new promotional method in which casinos can better target promotions and advertisements to players.

SUMMARY OF THE INVENTION

It is an aspect of the present invention to provide improvements and innovations in monetary ticket usage and promotions.

The above aspects can be obtained by a method that includes (a) receiving a loyalty card in a card reader associated with a slot machine; (b) identifying a player associated with the loyalty card; (c) allowing the player to play the slot machine; (d) receiving a cashout request from the player; (e) generating a ticket record for a cashless ticket, the ticket record comprising a player identifier identifying the player; and (f) dispensing a ticket associated with the ticket record.

The above aspects can also be obtained by a method that includes (a) generating a cashless ticket with a cashout value and a bonus value with a condition attached; (b) allowing a player to wager using the cashless ticket; and (c) upon meeting the condition, the bonus value is available for cashout to the player.

The above aspects can also be obtained by a method that includes (a) awarding an incentive for a player; (b) receiving a comp card associated with the player; (c) receiving a cash amount from a player; (d) automatically identifying the incentive using the comp card; and (e) allowing the player to play the electronic gaming device with the incentive using the cash amount.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1A:
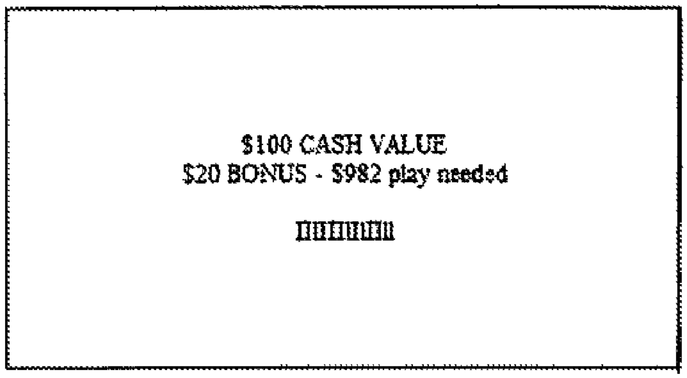
FIG. 1A illustrates an exemplary promotional ticket, according to an embodiment.

Reference will now be made in detail to the presently preferred embodiments of the invention, examples of which are illustrated in the accompanying drawings, wherein like reference numerals refer to like elements throughout.

The present invention relates to a method, apparatus, and computer readable storage to present casino machine game players with promotions, targeted promotions, and targeted messages.

In a first embodiment, a ticket can be generated that has a guaranteed cashout amount but also has a bonus amount that can be awarded upon successful completion of requirements.

For example, a ticket can have a $100 cashout value, and also have a $20 bonus value attached to it that can be redeemed by the player after the player plays a minimum of $1,000 in action. If the player does not meet the playthrough requirements, then the player is not able to cash out the bonus $20 but is still allowed to cash out the $100 value.

This can be advantageous for numerous reasons. For example, consider a player that requests a cashout at a slot machine with $100 on the credit meter. The casino prefers that the player continue playing as opposed to giving the player $100 cash. As such, the player can be presented with a ticket for the $100 that is owed to the player but the ticket can also include a $20 (or any amount) bonus amount associated with it. This may encourage the player to continue to wager at the casino as opposed to cashing the ticket in at the cashier or a redemption machine. Of course, the player should always be allowed to immediately redeem any money that is owed to him by the casino at any time, but there is nothing to prevent the casino from adding additional bonus money with conditions in order to entice the player to continue to play. If the player meets the criteria associated with earning the bonus money, then the bonus money can be credited to the player. If a player has earns a bonus, but goes broke before be cashes out, the player should still be entitled to the bonus (e.g. the bonus can still be awarded at the machine or dispensed in a ticket for the bonus). If the player has not fully earned the bonus yet, the player can cash out and come back later and continue where he left off (the player's progress towards the playthrough amount can be stored in a database (e.g. the ticket database associated with the ticket which contains the bonus or the player comp database, or any other database). Thus, bonuses earned can be persistent across gaming sessions, or they can good for one-time-use only.

FIG. 1A illustrates an exemplary promotional ticket, according to an embodiment.

The ticket illustrated has a $100 cash value and a $20 bonus value with a playthrough requirement (with $982 more needed to play). In other words, this ticket can currently be redeemed for $100. If the player wagers $982 in bets using the $100 on this ticket, then the player has met the playthrough requirement and can be awarded the bonus $20. If the player uses up the $100 without meeting the playthrough requirement, the player may optionally (depending on the casino's preferences) be allowed to use his or her own money to continue to play to meet the playthrough requirement to earn the $20. Along the same lines, the player may be allowed to deposit his or her own money (even if the balance isn't $0) while playing using a ticket with a playthrough bonus in order to use his or her own money to meet the playthrough requirements.

Figure 1B:
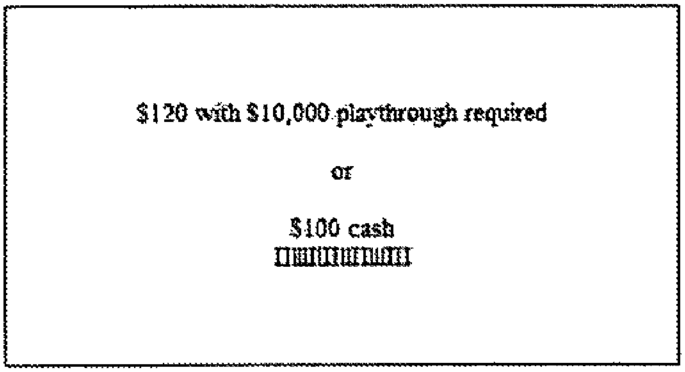
FIG. 1B illustrates an exemplary promotional ticket, according to an embodiment.

FIG. 1B illustrates an exemplary promotional ticket, according to an embodiment.

The ticket illustrated has a cash value of $100 or can be redeemed for $120 once a $10,000 playthrough requirement is met.

Figure 1C:
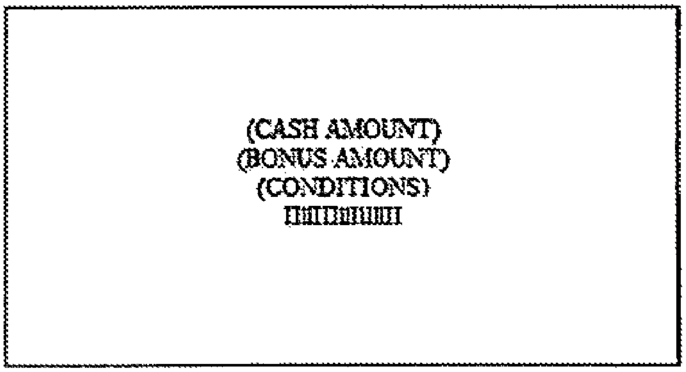
FIG. 1C illustrates a generic promotional ticket, according to an embodiment.

FIG. 1C illustrates a generic promotional ticket, according to an embodiment.

The ticket illustrated has a cash amount, a bonus amount, and conditions to earn the bonus amount printed on the ticket. All of this information is also stored in a ticket database in a record associated with the ticket.

Previously described was a system to personalize ticket messages. When a player cashes out, the player can be presented with messages, coupons, offers, incentives, etc. based on the particular player. These can be presented on a cashout ticket, on an output device of the gaming device, etc.

The messages can, for example, be broken up into categories. Such categories can comprise the following categories: impersonal non-valuable; impersonal valuable; personal non valuable; personal valuable.

An Impersonal, non-valuable message can be a message not mentioning a particular player and not having any valuable. The message may still be generated based on the player's particular playing record (e.g. info from the player record), but it may also be a generic message not based on the particular player at the machine. Examples of such messages can comprise: "Happy 4$^{th}$ of July," "Tonight is 2-for-1 steak night at the Buffet," and "One night only: Englebert Humperdinck at the Moonshine Bar," "Why did the chicken cross the road? To get to the Chicken Cacciatore station, this month only at the Buffet!"

An Impersonal, valuable message can be a message not mentioning a particular individual (although it may or may not be chosen based on the particular player's record(s) but has some value. Examples of such messages can comprise: "You've won a random bonus of $5," "Good for 10% off your purchase at the gift shop," "$10 off at the gift shop," and "Here's a line pass to the buffet."

A Personal, non-valuable message can be a message mentioning the particular individual cashing out (or at a particular machine and earning some type of output) and is based on information that the casino may have about the player (from any of the casino databases, e.g. casino marketing, playing history, hotel room database, etc.). Examples of such messages can comprise: "Happy Birthday, Shirley!," "Congratulations on your big win, Shirley!," "Thanks for playing, Shirley!," "Horoscope for Saggitarius: You will have a meaningful business venture soon," "Nice job on that 4-of-a-kind!"

A Personal, valuable message can be a message mentioning the particular individual cashing out (or at a particular machine and earning some type of output) and is based on information that the casino may have about the player (from any of the casino databases, e.g. casino marketing, playing history, hotel room database, etc.). Examples of such messages can comprise: "Hey Moe, that was your 25$^{th}$ 4-of-a-kind this week; come to the Rewards desk for a personalized baseball hat!," "This ticket good for a $5 buffet comp.," "Your play has earned you a free round of golf at Rio Secco, Larry!," "Curly, we value your patronage and have sent a complimentary wine and cheese basket to your room," "Ralph, it's 7:15 and it's almost dinner time: if you play for another ½ hour, we'll set up an 8:00 reservation for you and your wife Alice at the steakhouse and buy you dinner."

In many cases, the ticket itself may have dual value as a coupon or comp and as a cashout ticket. It may not be ideal to allow the player to cash in the ticket and then give back the same ticket to the player because of its value, since this can be confusing as redeemed tickets are typically retained by the casino.

To address this issue, a ticket with a promotional offer plus a cashout amount is redeemed by the player at the cashier, and the cashier returns the cash plus a no-cash-value ticket with the same promotional offer. Alternatively, if the player redeems the valuable ticket at a redemption machine, then the machine can dispense the cash along with a no-cash value ticket with the same promotional offer.

Alternatively, two tickets can be issued at the slot machine, one with the cashout amount only (or cashout amount plus non-value message) and the other with the valuable promotional offer. This can be extended so that a machine can issue multiple tickets (>2) with various offers or coupons. For example, anyone who hits quad Aces on Wednesday could get their cashout ticket, a second ticket with a line pass to the buffet, and a third ticket good for a free baseball cap that says "I hit Quad Aces on Wednesday at Palace Station!"

It is noted that the casino may want to offer these promotional tickets when a player busts out, too. It may not be fair to withhold a comp because the player busted, and may not be legal either. In the example above, if someone hit quad Aces on Wednesday but lost it all back, they should still be able to get the two tickets (or other method to award the value) for the line pass and baseball cap. Further, there may be a method, either player-initiated or automatic, for receiving those offers even if there are no credits remaining on the machine. Thus, if a player busts out (loses all his or her money), he or she may still receive a ticket (no cash value but may have other value as described herein such as a free cap, etc.) from the ticket printer associated with the machine.

Player-initiated could mean "hit the cashout button, even though there are no credits left, because the game indicates that comps or coupons are available (e.g. the player has earned a hat coupon but busts out). When the player card is removed, the game may flash "You have an available coupon for a baseball cap (or other incentive). Press "Cash Out" to redeem!". This can be done with a short, maybe 5 or 10 second timer (visible or not), so that the game will revert to play mode if not redeemed. This message can also appear after 5 or 10 seconds of zero bankroll idle status even if the card is left in. Lots of players leave cards in machines in disgust after busting out, and you want to give them a fair opportunity to at least get their hats.

Automatic can simply mean spitting out the ticket automatically after the card is removed or if the machine sits idle with zero bankroll for more than a few seconds. You'd want to display an informational message on the machine while this was going on to avoid the appearance of malfunction.

Further, the types of messages described above can also be displayed on a ticket redemption machine (as described herein), and any value (or pass, voucher, etc.) can be dispensed in a coupon or ticket dispensed with any cash. This will be described below in more detail.

Figure 2:
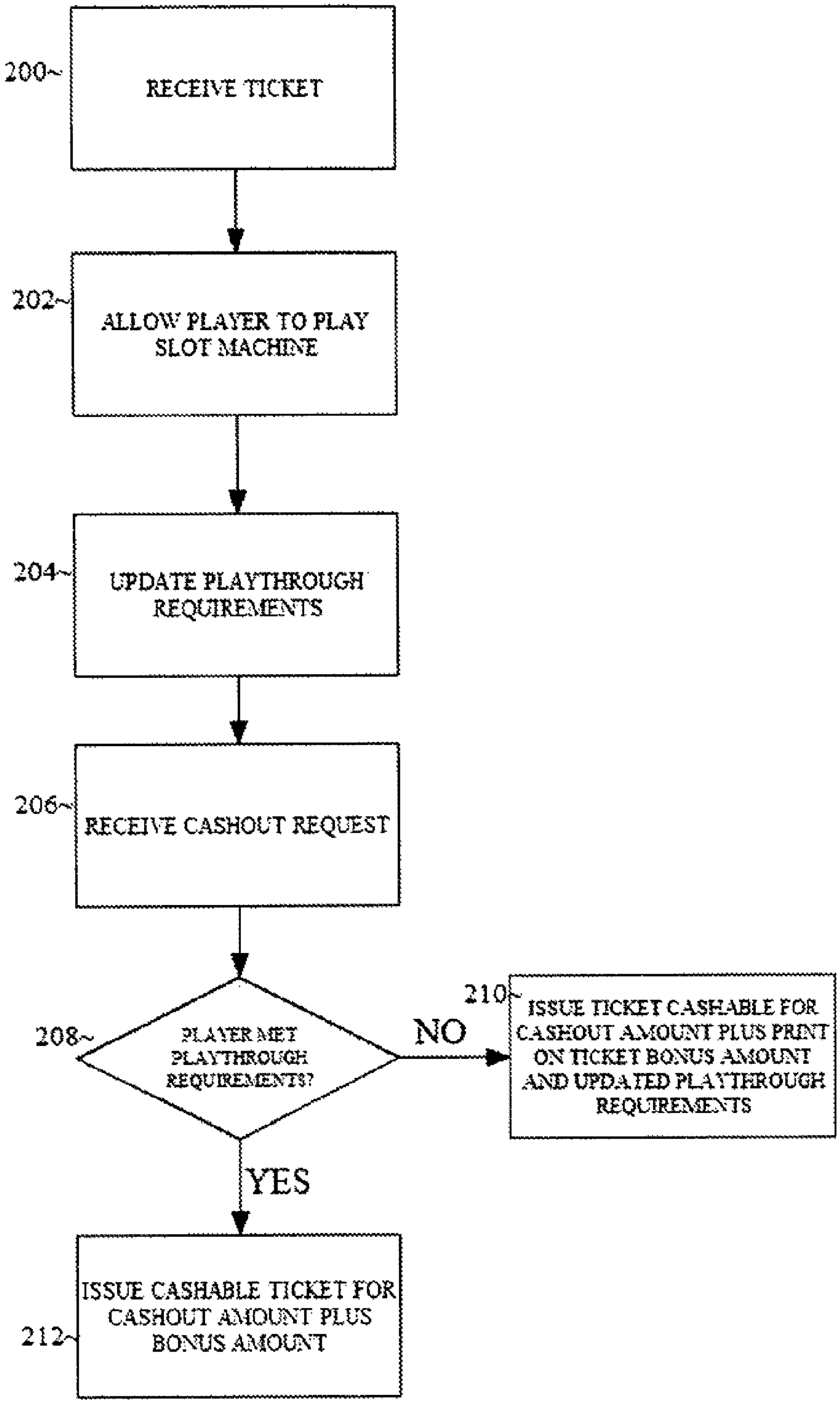
FIG. 2 is a flowchart illustrating an exemplary method to process a promotional ticket, according to an embodiment.

FIG. 2 is a flowchart illustrating an exemplary method to process a promotional ticket, according to an embodiment. The promotional ticket processed by the method in FIG. 2 can be used with a promotional (or special) ticket with conditions attached, such as a playthrough requirement, such as those illustrated in FIG. 1A, 1B or 1C.

The method starts with operation 200, wherein a ticket reader receives a ticket from a player. The system can verify the player's identify before processing the ticket, such as by verifying the proper comp card is inserted, etc. Verification of identify can be important for personalized bonuses, coupons, etc., that are not bearer instruments.

From operation 200, the method proceeds to operation 202, which allows the player to play the slot machine.

From operation 202, the method proceeds to operation 204, which updates the playthrough requirements. This can be done on a play-by-play basis or based upon a plurality of plays. For example, each time the player wagers $1, the playthrough requirements can be reduced by $1 in the ticket record associated with the ticket. The local slot machine can communicate with the ticket server in order to update the record. Alternatively, the plays can be maintained locally at the machine level, and when the player cashes out the machine can transmit the amount played to a ticket server in order to update the playthrough requirements associated with the ticket.

From operation 204, the method can proceed to operation 206, wherein the machine receives a cashout request from the player.

From operation 206, the method proceeds to operation 208, which determines whether the player has met the playthrough requirements.

If the determining in operation 208 determines that the player has not met the playthrough requirements, then the method proceeds to operation 210, which issues a ticket cashable for the cashout amount plus prints on the ticket the bonus amount with updated playthrough requirements. Thus, for example, if the player starts with a ticket with a $100 cash value and a $20 bonus with a $1000 playthrough requirement, and the player wagers $600 and cashes out (with $100 on the meter—the player broke even), then the ticket outputted will be worth $100 cash plus a $20 bonus with a $400 playthrough requirement.

If the determining in operation 208 determines that the player has met the playthrough requirements, then the method can proceed to operation 212 which issues a cashable ticket for the cashout amount (the amount currently in the player's credit meter) plus the bonus amount. This is a standard ticket with no conditions attached. Thus, in the previous example, if the player has met the playthrough requirements, then the ticket generated would be simply worth simple $120.

Further, it is noted that prior to cash-out, if the player has earned the bonus amount, the bonus may go directly into the credit meter or alternatively onto some non-playable bonus meter. Alternatively, the bonus can be awarded on a cash-out ticket, or on a further ticket dispensed if the player has busted out.

Further, if a player redeems a ticket with a bonus that is not completely fulfilled, either the bonus can be forgotten, or alternatively, the unearned bonus can be saved in a player's account so the player can still earn it with new cash inserted into a machine.

Figure 3:
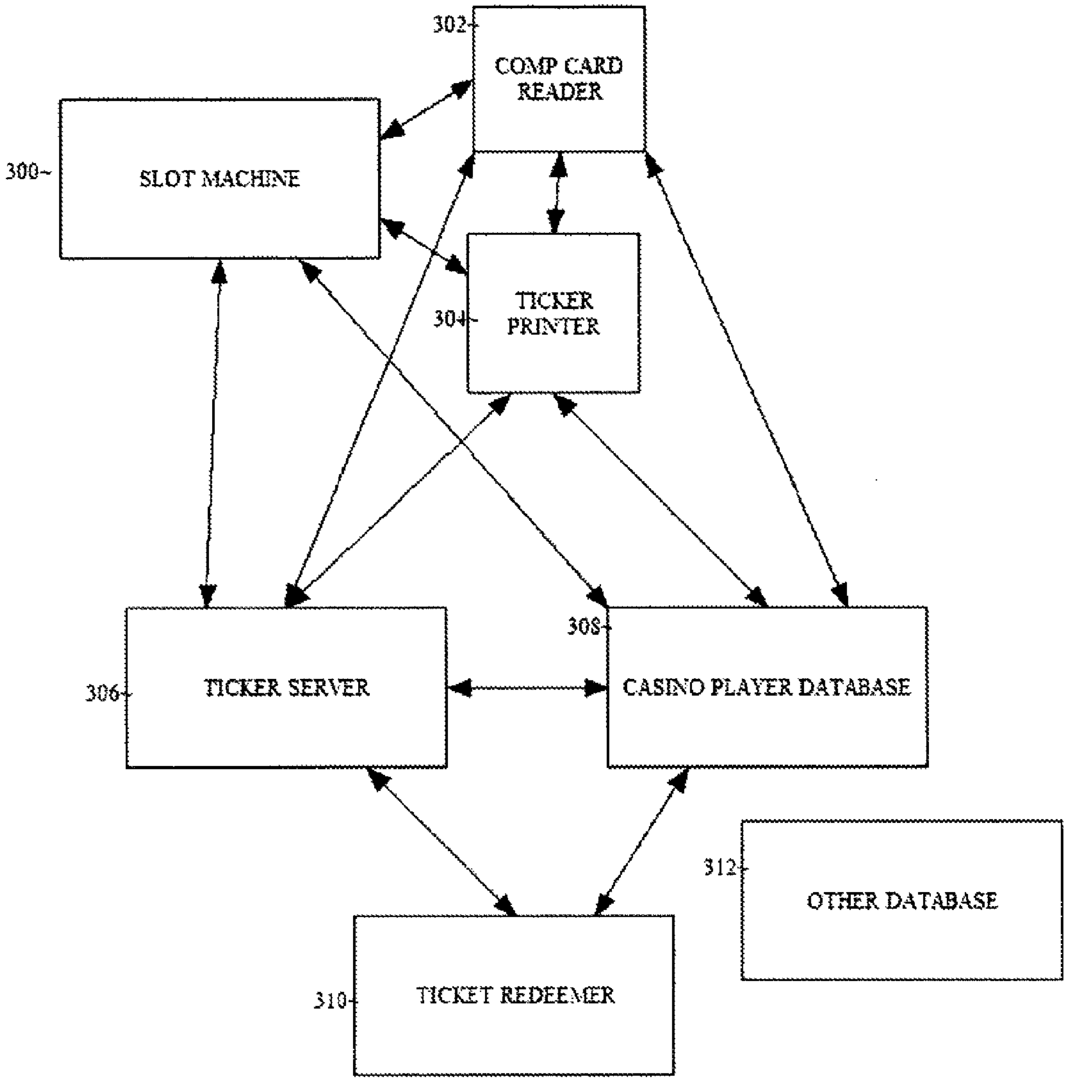
FIG. 3 is a block diagram illustrating exemplary hardware used in a casino environment, according to an embodiment.

FIG. 3 is a block diagram illustrating exemplary hardware used in a casino environment, according to an embodiment.

A slot machine 300 can be connected to or associated with a comp card reader 302 and a ticket printer 304. Not pictured is a ticket reader which is also associated with the slot machine 300.

A ticket server 306 is used to communicate with the ticket printer 304 and the ticket reader and can also store (or communicate with a database) that stores ticket records. A casino player database 308 is used to store player records which can comprise playing histories and player profiles, etc.

A ticket redeemer 310 is used by a player to redeem a ticket for cash. The ticket redeemer should be in communication with the ticket server 306 and/or the ticket database that stores ticket records so that the redeemer 310 will know how much a ticket should be redeemed for.

Another database 312 can be connected to any or all of the other described components and can be used to perform any other needed feature or operation.

Figure 4:
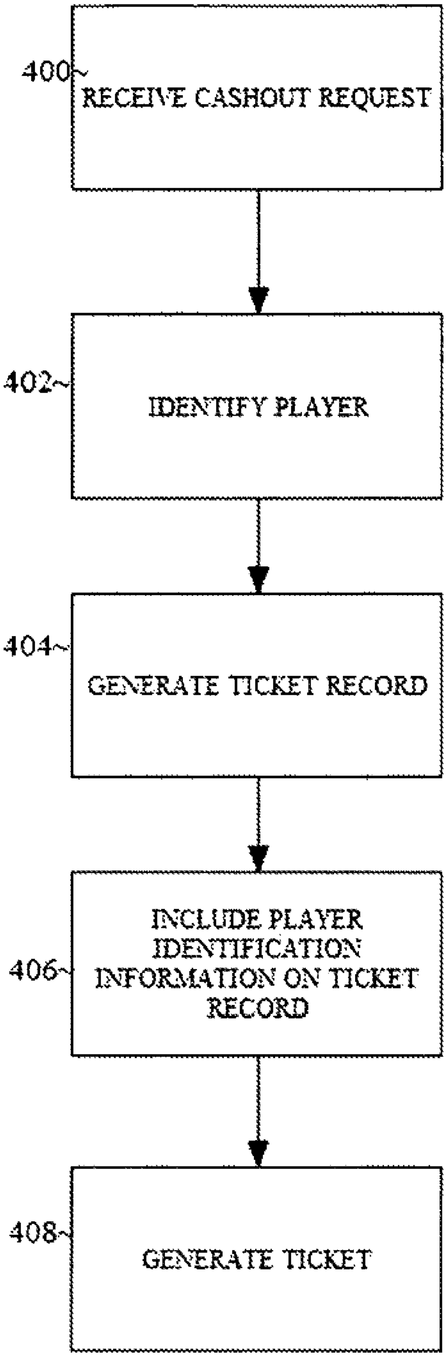
FIG. 4 is a flowchart illustrating an exemplary method of associating a player with a cashless ticket, according to an embodiment.

FIG. 4 is a flowchart illustrating an exemplary method of associating a player with a cashless ticket, according to an embodiment.

The method starts with operation 400, which receives a cashout request from a player.

The method then proceeds to operation 402, which identifies the player. This can be done by using the comp card currently inserted in the system. If there is no comp card currently in the system, then the system can check to see if a comp card was used during the play that generated the current cashout request. If no comp card (or other identifying card) was ever used, then it may not be possible to identify this player.

From operation 402, the method proceeds to operation 404, which generates a ticket record for the new ticket to be printed.

From operation 404, the method proceeds to operation 406, which includes player identification information in the ticket record. This can preferably be the player's player number associated with the casino's loyalty account database, but the identification information can also be other information such as the player's sex, age, or a special message to be displayed to the player upon redemption.

From operation 406, the method proceeds to operation 408, which generates the ticket. The player may or may not know that he or she has been associated with the ticket.

Thus, the method illustrated in FIG. 4 associates a generated ticket with the player that earned the ticket. This information can be useful when the player redeems the ticket, so that the player can be presented with a personalized message or bonus offer.

When a player presents a ticket to a redemption machine to exchange for the cash value of the ticket, the redemption machine can use the associated player information.

Figure 5:
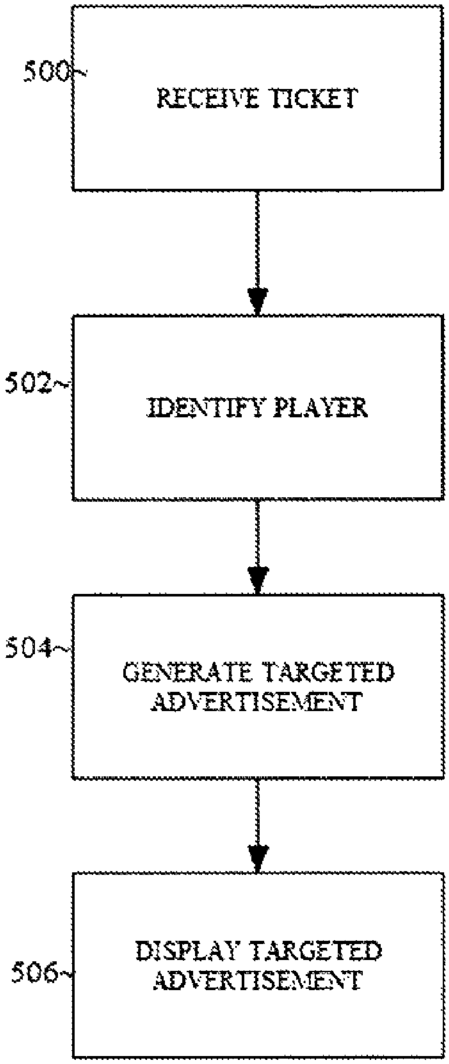
FIG. 5 is a flowchart illustrating an exemplary method of presenting a targeted advertisement upon ticket redemption, according to an embodiment.

FIG. 5 is a flowchart illustrating an exemplary method of presenting a targeted advertisement upon ticket redemption, according to an embodiment.

The method starts with operation 500, which receives a cash ticket from a player.

The method then proceeds to operation 502, which identifies the player using the ticket. This is done by identifying the ticket number associated with the ticket (typically done by reading a barcode). The ticket number is then associated with a ticket record. The ticket record can have the player's loyalty account number (or any other information) that earned the ticket, as described above. The players identifying information can be used to generate the targeted message (as described below).

From operation 502, the method proceeds to operation 504, which generates a targeted advertisement (or message or coupon). The targeted advertisement can be generated at the local level (by the redemption machine itself), or generated by a remote server and transmitted to the redemption machine. The targeted advertisement may also be generated when the ticket was generated and stored in the ticket record.

The advertisement can be generated by reviewing any information the casino may have about the player and determining a message which may be more effective than a generic message.

For example, a player that likes to play video poker (as determined by the player's playing history) can receive a message about a new video poker machine the casino has. Alternatively, if the player likes to play a particular type of slot machine (e.g. 5 reel slots) then the message can advertise a particular type of 5 reel slot machine. Alternatively, if the player likes to play 3 reel slots and has played some but not all of the 3 reel slots, then the message can advertise the machine that the player did not yet play. Alternatively, if the player did not play a particular machine, the message can advertise the particular machine. Alternatively, if the player hit a large payout (e.g. a royal flush or a 7 7 7) then the message can say "congratulations on hitting the royal." Alternatively, if the player won a large amount of money (e.g. greater than a predetermined threshold (for example $500)) then the message can be an advertisement (and possibly a coupon) for a shop. Alternatively, if the player is cashing out a lot of money (regardless of the win/loss), then the message can be an advertisement (and possibly a coupon). Alternatively, if the player's sex is female (or male), then a message can be presented which is more effective for that sex (e.g. an advertisement for a jewelry shop). Alternatively, if the player is a hotel guest, then a message can be presented advertising a service for hotel guests (e.g. the spa). Such messages can also be displayed elsewhere besides at the machine level, ticket level, or ticket redemption level. For example, such a message can be stored in database (e.g. the ticket database or any other), so if the player were to redeem the ticket in person at a cashier, an output device can display a message to the cashier about the player hitting a royal flush, so the cashier can say to the player, "congratulations on hitting that royal flush Pat!" The cashier can also say something like, "Buddy, you've earned a coupon for a massage/line pass to the buffet/etc." and hands you the coupon. Personal interaction with another human can be more compelling than reading a personalized message on an LCD screen, even though it requires the cashiers to be trained to talk to you instead of just count cash.

From operation 504, the method proceeds to operation 506, which outputs the targeted advertisement. The targeted advertisement can be presented on a LCD or other display device associated with the redemption machine. The targeted advertisement can also be presented on a paper slip presented to the player along with his or her cash. The targeted advertisement can also be a coupon presented on such a paper slip.

In addition to presenting a message, a bonus offer can also be presented to the player. The bonus offer can be, for example, an additional ticket with bonus money with a cash-out requirement. This can be advantageous for the casino in that player's can be redirected from the redemption machine back to the slot machines to play more. For example, if a player deposits $100 in a slot machine, wins $200, and redeems the $300 ticket at a redemption machine, he can be presented with a bonus offer. A bonus offer screen can allow the player to choose to take the $300 cash he or she is due, or receive a further ticket for a total amount greater than $300. The total amount can comprise a nonconditional cashable amount and a conditional bonus amount. For example, the player can receive a ticket worth $300 cashable with a $30 bonus with a condition attached (such as a playthrbugh requirement). The player can also receive a ticket with $400 in credits with a $500 cashout threshold (as described in the prior application) or any type of special or incentive ticket.

The bonus offer should be attractive to the player and also ideally profitable for the house. For example, if a player who likes to play video poker is playing at a 90% return rate, and the player redeems a $100 ticket, the redeemer can offer the player $100 cash or a ticket worth $110 with a $200 playthrough requirement. Since the player is playing at 90%, then $200*(1-0.9)=$20, thus the player is expected to lose more than the bonus amount. If the player likes to play 5 reel slot machines, then the bonus amount can be computed similarly. The bonus amount should ideally (although not required to be) less than the expected player return multiplies by the playthrough requirements. The expected return can be estimated by reviewing the games the player likes to play. A weighted average can be taken of the games' return. If the game is a skill game (such as video poker), the actual return achieved by the player can be used, or preferably the actual skill of the player can be used. Basically, the general concept is to review the player's playing history and present the player with a bonus offer that will be profitable for the casino yet appealing to the player. If the player's playing history reveals that the player typically likes to play for long periods of time, then it may be feasible to present the player with a mathematically "losing" offer (from the casino's perspective) with the expectation that the player will not quit when the player has met the bonus requirements.

Figure 6:
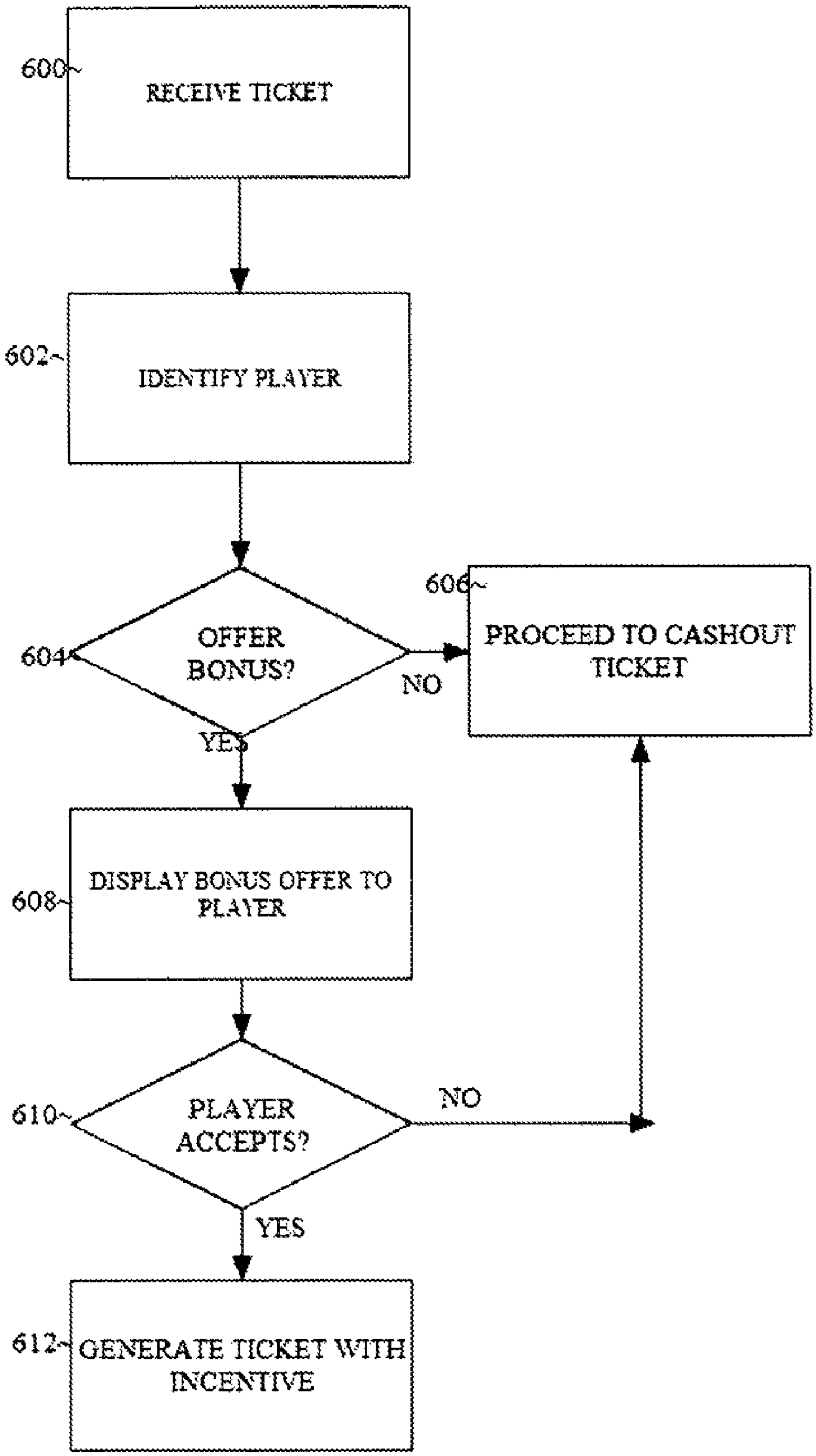
FIG. 6 is a flowchart illustrating an exemplary method of presenting a bonus offer to a player upon ticket redemption, according to an embodiment.

FIG. 6 is a flowchart illustrating an exemplary method of presenting a bonus offer to a player upon ticket redemption, according to an embodiment.

The method starts with operation 600, wherein an automatic ticket redeemer receives the cashless ticket from the player.

The method can then continue to operation 602, which identifies the player. This can be accomplished as described herein.

The method can then continue to operation 604, determines whether to offer the player a bonus (or incentive). This can be accomplished as described herein. If the player's history or profile is not conducive to such an offer (or there is no player associated with the record), then no bonus offer is made. As one example of the former, if the player only (or predominantly) plays video poker at a 100% return, then a bonus offer to the player would likely not be profitable. If the determining determines that an offer is not made, then the method can proceed to operation 606, which proceeds to cashout the ticket. However, the player can still be presented with a targeted message as described in FIG. 5.

If the determining in operation 604 determines to offer the player a bonus or incentive offer, then the method proceeds to operation 608 which displays the bonus offer to the player. The bonus offer can be determined in operation 604 or 608 (or any other operation) as described herein.

A table (or other data structure) can be created with player criteria and respective bonus offers, such as that exemplified in Table I. A bonus offer can be generated from such a table and the respective player's playing history.

TABLE I

| playing criteria | bonus offer |
|---|---|
| a) player skill < threshold | ticket for initial cashout amount plus bonus amount for < (1-average player return) * playthrough requirement |
| b) player likes to play 5-reel slots | ticket for initial cashout amount plus bonus amount for < (1-highest 5 reel slot return) * playthrough requirement. |
| c) player likes to play long period of time without cashing in | ticket for initial cashout amount plus bonus amount with optional playthrough requirement |

From operation 608, the method proceeds to operation 610, which determines whether the player accepts the offer. The player can indicate his or her preference simply by using a touch screen input device on the LCD. As described above, the player can be given the option to receive cash for the cashout amount or receive an alternative package. As to the former, of course the player should always be allowed to receive the cash amount due to him or her. As to the latter, an alternative package can be any of: a total amount with a playthrough requirement; a cashable portion and a bonus portion with a playthrough requirement for the latter; a cash amount along with any of the former; a coupon with any of the former; or any other approach described herein.

if the determining in operation 610 determines that the player does not accept the incentive offer, then the method can proceed to operation 606 which cashes out the ticket. The player can still be presented with a targeted message though (either on the LCD or on a separate paper slip with the cash) as described herein.

If the determining in operation 610 determines that the player has accepted the incentive offer, then the method can proceed to operation 612, which generates the ticket with incentive. This can be accomplished by generating a new ticket with any incentives or conditions attached, and/or also generating any additional coupons.

In a further embodiment, the above method can also be applied to a cashout at a slot machine (as opposed to a redemption machine). The player's profile can also be used when determining any bonus offers, items or shops for promotion or sale, etc. The player's profile can include the playing history and can also include any other information the casino knows about the player, such as where the player shopped, etc. If the player is a female over 50, then an expensive jewelry shop can be advertised. If the player lives in a zip code located in New York, then an item related to that demographic can be advertised (e.g. a NY Mets hat). These are all merely examples of using player profiles to generate targeted messages or offers for sale (to be described in more detail below).

Figure 7:
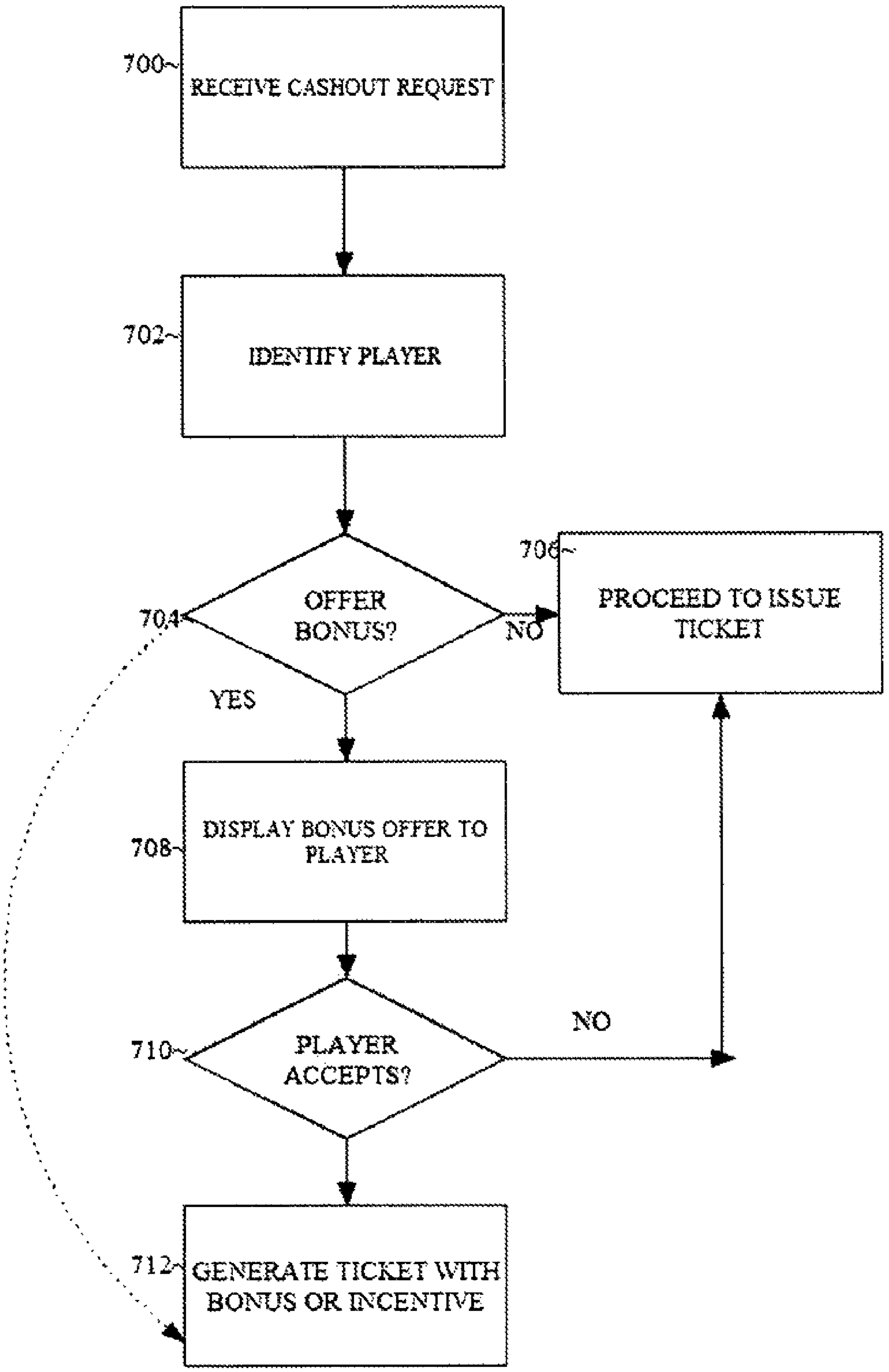
FIG. 7 is a flowchart illustrating an exemplary method of presenting a bonus offer to a player upon a cashout request at a slot machine, according to an embodiment.

FIG. 7 is a flowchart illustrating an exemplary method of presenting a bonus offer to a player upon a cashout request at a slot machine, according to an embodiment.

The method starts with operation 700, wherein a slot machine receives a cashout request.

From operation 700, the method proceeds to operation 702, which identifies the player. This is accomplished as described herein.

From operation 702, the method proceeds to operation 704, which decides whether to offer a bonus. If no bonus is to be offered, then the method proceeds to operation 706, which issues the ticket. A targeted message can still be presented to the player, as described herein.

If a bonus offer is to be made, then the method can proceed to operation 708, which displays the bonus offer to the player. This can be accomplished by outputting the offer on the slot machine display itself or alternatively on another external output device.

From operation 708, the method proceeds to operation 710, which determines whether the player accepts the bonus offer. If the player does not accept, then the method can proceed to operation 706, which issues the ticket.

If the player accepts the offer, then the method proceeds to operation 712, which generates the ticket with the bonus or incentive as described herein. In an embodiment, if operation 704 decides to offer a bonus (or incentive), then the bonus can also automatically be generated upon cashout. In this embodiment, the bonus or incentive should not be restrictive at all but only additive. In other words, the player should not be restricted in redeeming his or her earned cash, but an additional bonus can be presented on the ticket with a condition attached. If the player does not meet the condition, then the player cannot cash out the extra amount but should always be allowed to cashout the earned amount.

As an alternative (or in addition) to associating the ticket record with the respective player, the player may be required to insert his or her comp card upon ticket redemption. In this manner, the player can be identified using the comp card record and any of the embodiments described herein can be performed using this identification method. The same procedure may be required upon redemption at a cashier.

Figure 8A:
FIG. 8A is an output illustrating an exemplary targeted bonus offer, according to an embodiment.

FIG. 8A is an output illustrating an exemplary targeted bonus offer, according to an embodiment.

The output device displays an option to either receive cash or receive a bonus offer.

Figure 8B:
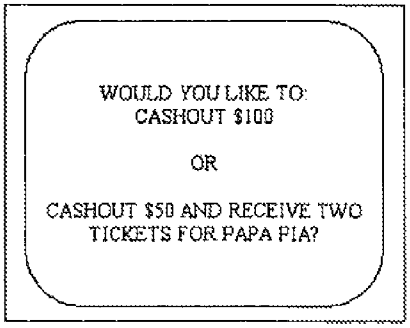
FIG. 8B is an output illustrating an exemplary targeted bonus offer, according to an embodiment.

FIG. 8B is an output illustrating an exemplary targeted bonus offer, according to an embodiment.

The output device displays an option to either receive cash or receive a voucher, coupon, or other instrument redeemable for a good or service (and a cash difference between the cashout amount and the value of the good or service can be dispensed as well). In this manner, goods or services can be sold at a time when the player has money and can easily purchase something. For example, when a player is cashing out money after gambling, it is likely the money is expendable to the player, and thus this is an ideal opportunity to present the player with some type of sale. In addition to show tickets, vouchers for meals (or coupons for restaurants), trips, additional night stays, etc. can all be offered for sale (at normal price or at a discount) to the player. If the player is a desirable player based on the player's playing history, then incentives like room stays may be given at a discount.

Players can also be offered the opportunity to purchase goods directly, upon which they receive a coupon to pick up the goods at a respective shop, or have the goods delivered to the player's room (or home). If the player is getting a good deal on the goods, then there should be some type of qualification involved. For example, the casino typically would not want a player putting in $20 into a machine, hitting cash-out without playing (or playing very much), and then being offered a good deal on an item (such as a sweater, a meal, a show, etc.) Qualification can be involved (although this is not required), for example the player should play a certain amount in action, lose or win a certain amount, etc.

Figure 8C:
FIG. 8C is an output illustrating an exemplary targeted message upon redemption, according to an embodiment.

FIG. 8C is an output illustrating an exemplary targeted message upon redemption, according to an embodiment.

The output device displays an indication of the players win or loss and a likely advertisement for a place the player may spend his or her money. The win or loss can be determined from the amount the player cashed in to the amount he is cashing out. In other words, play not involving the current ticket is not considered in this win/loss. Alternatively, the player's cumulative win loss (e.g. for his or her vacation) can be determined and used (e.g. the recent activity for the past week). Further, if the player has won money (or even lost but is redeemable a substantial amount of cash (e.g. >$100)), then a targeted message can be presented to him or her. The message can be targeted based on the player's playing or other history. For example, if the player likes to eat at steak houses, then a message directing the player to the steak house can be presented.

Figure 8D:
FIG. 8D is an output illustrating an exemplary targeted message upon redemption, according to an embodiment.

FIG. 8D is an output illustrating an exemplary targeted message upon redemption, according to an embodiment.

In this example, a particular event is displayed on the output device upon redemption. This may please the player as the player is reminded about their positive experience. A coupon can be dispensed with the cash, preferably targeted to an establishment the player is likely to use it based on their history.

Figure 8E:
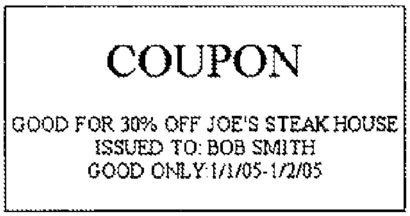
FIG. 8E illustrates an exemplary targeted coupon, according to an embodiment.

FIG. 8E illustrates an exemplary targeted coupon, according to an embodiment.

A coupon (or voucher or other instrument including a show ticket) can be dispensed along with cash from the ticket redemption machine. This can be done based on either an acceptance from the player (as described above), or just without any player direction. The coupon can contain the player's name (determined from the player record, as described above) and terms of the coupon (where it can be used, for how much off or a discount rate, etc.)

All of the examples described herein of targeted messages and bonus offers can also be presented to the player in other manners as well besides at redemption. For example, they can be mailed, emailed, place in a guest's room, etc.

As stated above, noteworthy events (e.g. a royal flush) can be recorded in a player's playing history record to be noted later in a targeted message or promotion.

Figure 9:
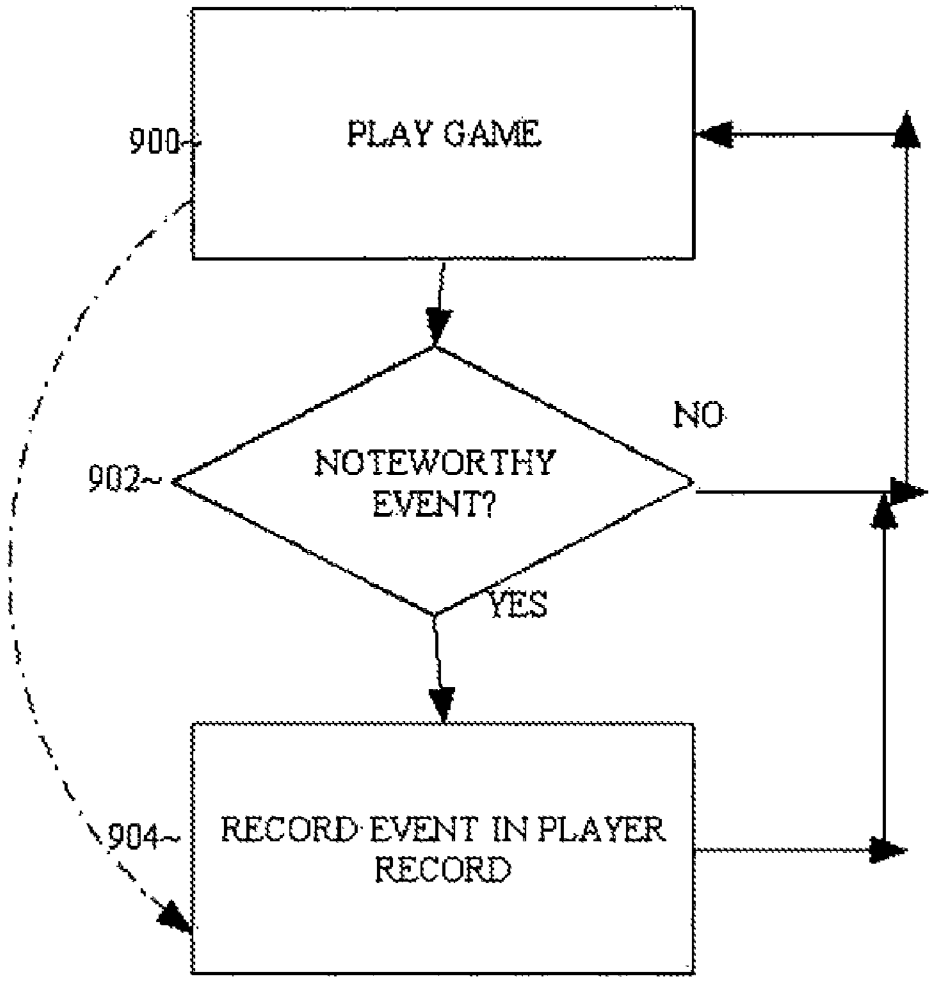
FIG. 9 is a flowchart illustrating an exemplary method of recording noteworthy events during play, according to an embodiment.

FIG. 9 is a flowchart illustrating an exemplary method of recording noteworthy events during play, according to an embodiment.

The method starts with operation 900, which allows the player to play a game (slot, video poker, or any wagering game).

From operation 900, the method proceeds to operation 902, which determines if a noteworthy event has occurred. A table can be maintained of noteworthy events, and after each game (e.g. hand, spin, etc.) the results can be compared with the table to see if the event is worth recording. If no noteworthy event has taken place, the method can return to operation 900.

If a noteworthy event has taken place in operation 900, then the method can proceed to operation 904, which records the noteworthy event. The noteworthy event can be recorded in a record associated with the player's comp card account.

In a further embodiment, all events can be recorded, and these can be analyzed later to see if they include any noteworthy events, thus obviating the need for operation 902.

Figure 10:
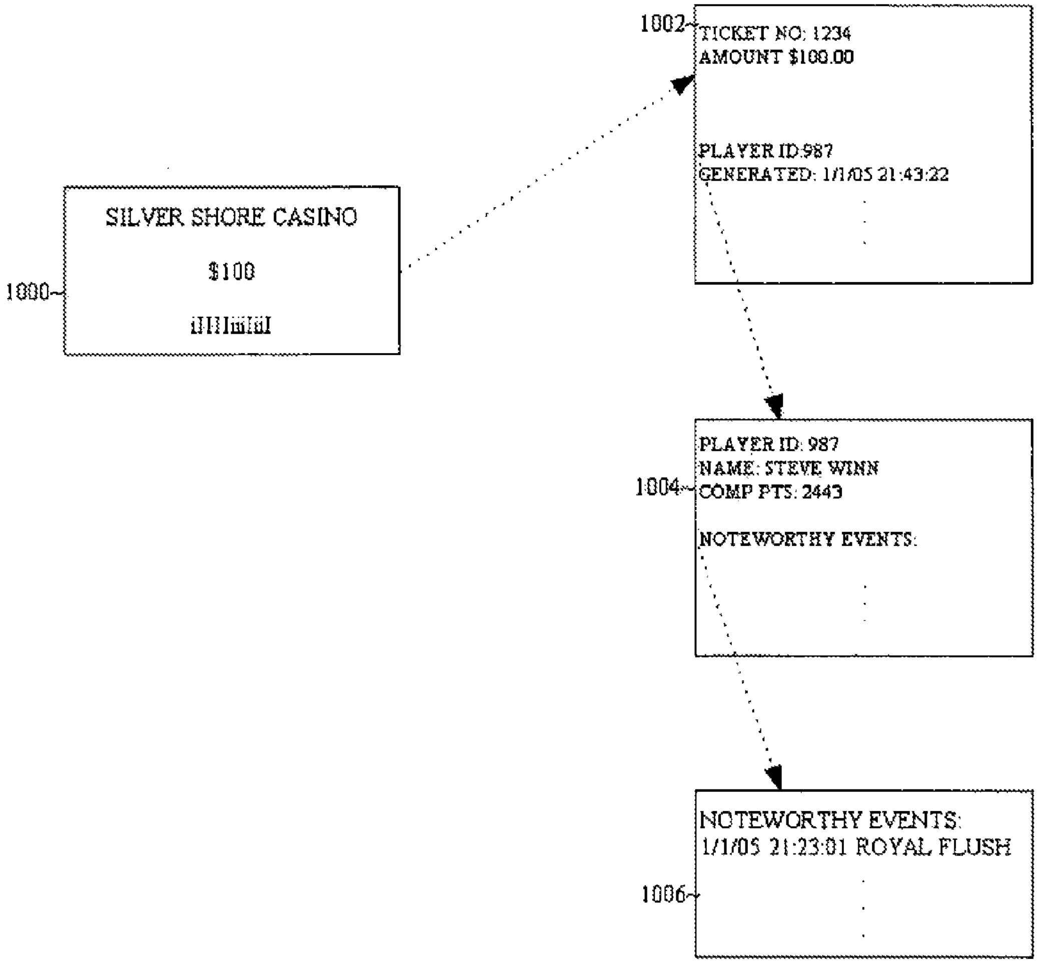
FIG. 10 illustrates an example of a cashless ticket and related records, according to an embodiment.

FIG. 10 illustrates an example of a cashless ticket and related records, according to an embodiment.

A ticket 1000 is associated with a ticket record 1002. This is accomplished by a number on the ticket, typically in the form of a barcode.

The ticket record 1002 stores information related to the ticket 1000, and information stored is not limited to what is pictured in FIG. 10. The ticket record can also have associated with it a particular player, which can be identified by a player number. This can typically be the player's comp account number, although it is not required to be. The player can have a player's record 1004 associated with him or her, which can include the pictured information and also any other information needed.

The player's record 1004 can also be associated with a noteworthy events record 1006. The noteworthy events record can list all noteworthy events, such as royal flushes, etc. Alternatively, a record can have all events associated with the player's play, including all plays, outcomes, etc. This record can be used to determine noteworthy events by reviewing each entry in the record to see if it is a noteworthy event or not (this can be done automatically or manually).

As can be seen by FIG. 10, a ticket can be used to retrieve a wealth of information regarding the circumstances how the ticket was generate, the player who generated it, etc. All of this information can be used to generate targeted messages and bonus offers.

In a further embodiment, casino conditions can be used to determine (or as a factor in determining) whether to generate bonus offers. During a busy time in the casino, machines may not be idle, which is less reason to give bonus offers for play which can use up machines for possibly less profit than a non-bonus offer player. When the casino is less busy, it may make more sense to be more willing to give bonus offers since some profit on a machine per unit time is better than none at all. As one possible example of how this can be accomplished, if the percentage of idle machines is less than a predetermined threshold (e.g. 50%), then bonus offers (comprising any type as described herein) may not be given or the criteria to earn a bonus offer can be raised.

In a further embodiment, players can be associated with their ticket in other manners. For example, database records of the ticket server, individual machines, player loyalty accounts, etc., can be referenced, cross referenced, indexed, etc.

For example, each machine typically keeps a record of the tickets it has issued. Table II illustrates one example of such a record for an individual machine. This record can be kept at the machine level, a master database, etc.

TABLE II

| Machine ID - 003245 | | | |
|---|---|---|---|
| ticket # | amount | time/date of cashout | player |
| 02343 | $55 | 12:23 Jan. 01, 2003 | unknown |
| 02344 | $100 | 14:01 Jan. 01, 2003 | unknown |
| 02347 | $149.64 | 19:30 Jan. 01, 2003 | unknown |
| 04358 | $50.00 | 02:02 Jan. 02, 2003 | 012345 |

Table II illustrated all cashouts for machine #003243. Note that the ticket #'s are not always sequential because other machines may request cashouts. The ticket #'s are typically assigned by a ticket server (not the machine itself). A further master list can be kept which combines cashout requests for all machines.

TABLE III

| Machine ID # | ticket # | amount | time/date of cashout | player |
|---|---|---|---|---|
| 003243 | 02343 | $55 | 12:23 Jan. 01, 2003 | unknown |
| 003243 | 02344 | $100 | 14:01 Jan. 01, 2003 | unknown |
| 003243 | 02347 | $149.64 | 19:30 Jan. 01, 2003 | unknown |
| 003245 | 02348 | $20.34 | 19:31 Jan. 01, 2003 | unknown |
| 003245 | 04358 | $50.00 | 02:02 Jan. 02, 2003 | 012345 |

A database can maintain records of player activity according using a player's comp card. For example, Table IV illustrates a record associated with a particular player's comp card.

TABLE IV

| Player ID: 012345 Jim smith | | | | |
|---|---|---|---|---|
| Machine ID # | ticket | # amount | activity | time/date |
| 003243 | n/a | $55 | cash deposit | 12:23 Jan. 01, 2003 |
| 003243 | n/a | n/a | play | 12:23 Jan. 01, 2003-14:01 Jan. 01, 2003 |
| 003243 | 02347 | $149.64 | cashout | 15:01 Jan. 01, 2003 |
| 003245 | 02347 | $149.64 | ticket in | 19:31 Jan. 02, 2003 |
| 003245 | n/a | n/a | play | 19:31 Jan. 02, 2003-20:29 Jan. 01, 2003 |
| 003245 | 04358 | $50.00 | cashout | 02:02 Jan. 02, 2003 |

Table IV illustrates a record(s) for a particular player. This can track the player's playing history (as long as the player uses his or her card). Of course such records can include additional fields (as known in the art), or may lack fields included in Table IV.

A record associated with a ticket number can have associated with the machine that printed the ticket. Using records such as illustrated in the above tables (and databases described herein and known in the art), the player who generated the ticket can be determined. For example, when Jim Smith redeems his ticket (#04358) at a ticket redemption machine, the ticket record associated with the ticket number (04358) is located. This record can include the machine ID that printed it (003245). Once the machine that printed the record is known, then that machine's record (or the records for more than one machine) can be queried to find the player who earned it. For example, from Table III, the ticket number is found and the player who earned it (which is initially stored because the player used his or her comp card) can be retrieved it. Even if the database does not store the player who earned the ticket, the times the ticket was generated can be matched with the time the player played (and/or cashed out). For example, ticket #04358 can have machine #003245 in the ticket's record as the machine that generated it. The ticket record can also have the time/date the ticket was generated. The comp system database can be queried to determine who was playing a particular machine at a particular time (as long as the player used his or he comp card or some other identifying mechanism).

Thus, basically, given a ticket record for a ticket, other information can be associated with that ticket record, which may include the player identification and/or the machine that generated the ticket and/or the time/date it was generated, etc. A database can kept of tickets generated for each machine and possibly player play for each machine. A player database can also be kept of players and their playing history. These databases can all be queried to determine a player that earned a ticket based on information known to the system (initially starts with just the ticket record). Further, while it is assumed that a loyalty card is used to identify a player, any other known method can also be used to identify a player, such as biometric information, etc.

In a further embodiment, as an alternative to cashless tickets, any of the embodiments herein can also be used with a card-cash system. A card-cash system is a system that does not use cash or tickets but instead allows players to access money via a card (such as a comp-card). Typically these cards have a PIN number associated with them. Thus, for example, a player can go to a redemption machine and present his or her card to cash-out. The player can then be presented with any of the features herein, such as being presented with a bonus offer, targeted message, coupon, etc. Instead of putting the bonuses on tickets, bonuses can exist (or be associated with) the player's record, upon which the player can review the bonus conditions directly at slot machines. For example, as a player is playing (or before or after), the slot machine can display the player's bonus amounts and conditions attached (the conditions can be updated in real time as the player plays).

In yet a further embodiment, special incentives (such as special paytable, etc.) can be offered but with the player's own money. For example, a player can be sent a ticket giving the player double royal flushes. However, the ticket has no cash value, and the player should use his own funds in order to realize the double royal flushes. For example, the ticket can allow the player up to $100 of his or her own money to use for double royal flushes, and when that money is all gone, the double royal flush privilege is gone. This feature (like any other feature described herein) can also be use without tickets but with an indication in the player's record that the player is allowed double royal flushes (or any other advantage.) For example, when the player inserts his or her comp card, the player may receive a message indicating that he or she has been awarded a special advantage (either with the casino's money as a promotion or using the player's own money). The embodiment described in this paragraph is illustrated in FIG. 11.

Figure 11A:
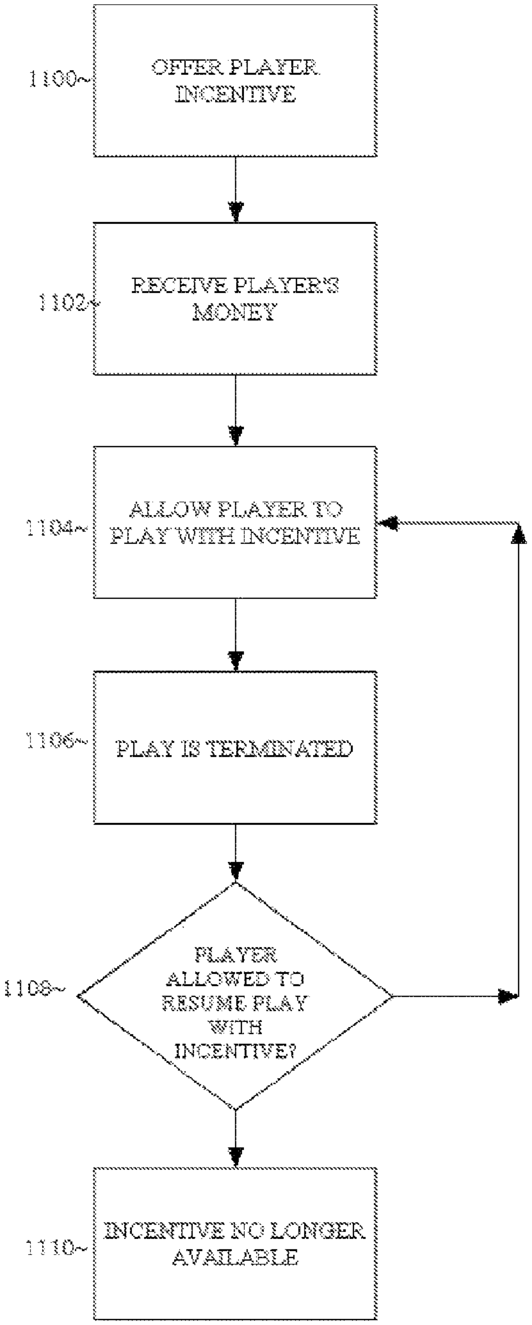
FIG. 11A is a flowchart illustrating a method of awarding special privileges, according to an embodiment.

FIG. 11A is a flowchart illustrating a method of awarding special privileges, according to an embodiment.

The method starts with operation 1100, which offers a player an incentive. The offering can be done after a determination is made to offer the incentive. For example, a video poker player with a skill less than a predetermined threshold (and also possibly a minimum hands or action requirement) can be offered an incentive such as double royal flushes. The player can be notified in a number of ways, such as on a cashless ticket, upon redemption of a cashless ticket, upon playing an EGD, via email, via regular mail, etc.

From operation 1100, the method proceeds to operation 1102, which receives the player's money. For example, the offer can be for double royal flushes for $100 (or any amount) fund. For example, the player can insert his or her $100 bill into a machine (and possibly a ticket or coupon granting the player the incentive, although the machine may automatically know about the incentive via the player's record (using his or her comp card) without need for a ticket or coupon). The player can wager with the $100 until the $100 is all gone. Thus, this is not limited to $100 in action, but can in theory be an unlimited amount of action. Alternatively, an incentive (such as double royal flushes, etc.) can be limited to a particular amount of action (e.g. $100 in action). Thus, for example, after the player makes 100 $1 bets, the player is no longer allowed the incentive. Alternatively, the player does not need his or her own money but the incentive also includes the money as well (which can be on the form of a ticket or stored electronically in the player's comp card account).

From operation 1102, the method proceeds to operation 1104, which allows the player to play with the incentive. This can be accomplished as described herein.

From operation 1104, the method proceeds to operation 1106, wherein the player terminates his or her play. The play can also be terminated automatically when the incentive runs out (e.g. the funds are gone, the allowed action is used up, a time limit has expired, etc.)

If the termination in 1106 was by the choice of the player, and the player later wants to continue playing the incentive (or special feature), then the method proceeds to operation 1108, which determines whether the player will be allowed to continue playing the incentive. This can be done according to the rules of the promotion. If the player was allowed $50 in action for the special paytable, and the player only used $25, then the player can continue with the remaining $25 in action. This data can be stored in the player record. Alternatively, the rules can allow the player to play with the initial money until it is all used up. For example, if the player is given an initial $100 in funds to wager with a special paytable until the $100 is all gone, and the player loses $40, then the player can continue at a later time with the remaining $60 until the $60 is lost or until the player decides to redeem his or her balance.

Thus, if the player is allowed to continue using the incentive, then the method can return to operation 1104. Alternatively, if the player is no longer allowed to use the incentive (either the rules do not allow interruption or the player has used up the limits of the incentive), then the method proceeds to operation 1110 which does not allow the player to continue using the incentive.

Figure 11B:
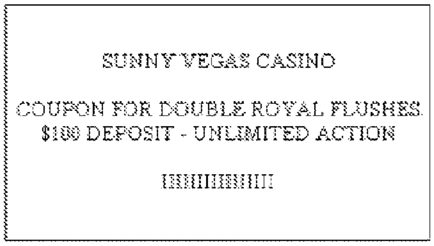
FIG. 11B illustrates an incentive coupon for $100 in unlimited action, according to an embodiment.

FIG. 11B illustrates an incentive coupon for $100 in unlimited action, according to an embodiment.

With the coupon illustrated in FIG. 11*b* (note this is just one example of such a ticket), the player is entitled to wager the proceeds from $100 (of his own money, although alternatively the casino can provide the money) with the incentive (incentive being a special paytable or other advantage to the player which can include additional or free money with or without conditions attached). Thus, for example, the player can continuously play until the original $100 is gone or the player decides to redeem the money in the credit meter.

The player can receive such a coupon upon cashout from a slot machine, in the mail, upon redeeming a cashless ticket for cash, via email, etc. The coupon may or may not be required to take advantage of the offer. The system may know (using the player's record) whether or not the player is entitled to such an advantage, and if so, the player may be prompted to take advantage of it without need for the coupon. If the player is required to present the coupon, then the player can insert the coupon first in the ticket receiver. After the coupon has been inserted, the player can then insert cash (e.g. a $100 bill). The player's may optionally be required to be inserted into the system in order to redeem the coupon.

Figure 11C:
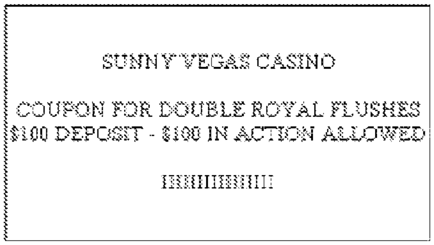
FIG. 11C illustrates an incentive coupon for $100 in action, according to an embodiment.

FIG. 11C illustrates an incentive coupon for $100 in action, according to an embodiment.

The ticket exemplified in FIG. 11C allows the player to wager $100 in action using the incentive. After the player has placed $100 in action, regardless of his wins or losses, the incentive period is over. The player may or may not be allowed to break up the incentive play in different sessions. For example, the player may be allowed to play $20 at one period and the remaining $80 at another period.

In an embodiment, a coupon may not have a monetary value associated with it but can still trigger a special mode or incentive that uses the player's money (or money given to the player by the casino). Thus, by inserting such a coupon into a ticket reader, the player is not necessarily credited with money but instead the machine is put into a special mode. This can be accomplished by receiving the coupon, and then identifying the coupon by its barcode. The coupon has a record associated with the barcode that has the rules or instructions for implementing the coupon. For example, a coupon for $100 in action double royal flush, will be identified by the system. The double royal flush mode can then be communicated to the EGD. If the EGD is not capable of running in this mode, this fact will be transmitted back to the host and the coupon can be rejected. The EGD or the host can track the player's play and terminate the mode upon completion of the allotted period (e.g. action limit), upon which a new signal is transmitted to the EGD to end the special more, thereby ending the incentive. Such a coupon can be used to give the player any incentive or advantage a machine can offer, such as allowing the player to immediately enter a bonus mode of the machine for free. Using a comp card may be required when using a coupon in order to provide some level of verification that the coupon is not transferred to another party.

An incentive or advantage such as a double royal flush can either apply to the paytable currently on the machine, or can use a pre-determined paytable for the incentive. For example, if a machine has a 1/2/3/4/6/9/25/100/250 paytable, then a double royal flush incentive can convert this machine to a 1/2/3/4/6/9/25/100/500 paytable. Alternatively, the double royal flush ticket may have its own paytable associated with it, such as a 1/2/3/4/5/7/25/100/500, and this paytable can be used for the incentive regardless of the current paytable in use on the machine.

It is noted that while the example above is for video poker with a double royal flush incentive, the methods described herein can be used for an electronic gaming device/game and with any player advantage that can be attached thereto. As an alternative to presenting the coupon directly to the machine, the coupon can also be presented to a cashier or other casino personnel that can activate the coupon. The incentive can then be available to the player automatically when the player plays an EGD. As a further alternative, the player may be able to activate the coupon himself or herself by logging on to an account on the Internet.

While a ticket redemption apparatus has been described which redeems a physical ticket, any of the embodiments described herein can also be used with an electronic money system wherein money is stored using a player's account. Player's can play with this money by using their card (and a form of verification such as a PIN number) at some or all machines. Money can be redeemed using a redemption apparatus similar to the ticket redeemer described herein, but instead it receives a player's card and a form of verification (e.g. a PIN number). Thus, when a player cashes out using electronic money (as opposed to a cashless ticket), the player can be presented with any of the features as described herein.

As an alternative to providing any of the bonuses or incentives described herein on a ticket, these can also be applied to electronic money as well. For example, a player who earns a bonus with a playthrough requirement can do so without receiving a physical ticket with conditions presented thereupon. Instead, the player can be presented with a display (e.g. on a slot machine) of the requirements to earn a bonus or when the player has earned the bonus. When the player earns the bonus, the money can be automatically credited to the player's electronic money account. If a player wishes to cash out electronic money, he can go to a redemption machine, insert his comp card (or electronic money card subject to verification) receive a respective amount of cash. The player can also be presented with targeted messages as described herein including receiving a physical coupon along with the cash as described herein. The player can be identified when cashing out using electronic money by using information on the player's card.

When a player cashes out at an EGD, any of the incentives, advantages, promotions, etc. described herein can be issued to the player. For example, if a player inserted $100 into a slot machine, won $500, and cashes out for the $600, the casino may wish that the player play some more and not cash out. So the player may receive a ticket worth $600, but with a $50 bonus attached with a playthrough requirement (e.g. the type of tickets illustrated in FIG. 1A or 1B). Such a ticket can also be offered to the player upon redemption in the hopes the player will forego the cash to play some more to earn the bonus.

Further, tickets or coupons need not be required to trigger any special promotional mode (such as double royal flush or other special paytable). The player's player account can store if a particular player is entitled to a special mode (selected as described herein with regard to tickets/coupons), and upon the player inserting his or her comp card into the system, the mode can automatically be triggered without need for a physical ticket or coupon.

It is also noted that any and/or all of the above embodiments, configurations, variations of the present invention described above can mixed and matched and used in any combination with one another. This also includes any prior document incorporated by reference, and any feature described herein can also be applied to any such documents. Any claim herein can be combined with any others (unless the results are nonsensical). Further, any mathematical formula given above also includes its mathematical equivalents, and also variations thereof such as multiplying any of the individual terms of a formula by a constant(s) or other variable. Special modes, tickets, special tickets, incentives, promotions, promotional modes, bonuses, coupons, and any other instruments or operations described herein may be used in place of one another.

Moreover, any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A system, comprising:

a slot machine associated with a card reader and a ticket dispenser, configured to a) receive a loyalty card in the card reader and enable an identification of a player associated with the loyalty card, b) enable play of the slot machine; c) receive a cashout request and generate in an electronic database an electronic ticket record for a cashless ticket, the electronic ticket record comprising a player identifier identifying the player associated with the loyalty card; d) dispense from the ticket dispenser a ticket associated with the electronic ticket record; and a ticket redemption machine and a display device, configured to a) receive the ticket, b) retrieve the electronic ticket record associated with the ticket from the electronic database; c) identify the player using the player identifier retrieved in the electronic ticket record; d) display a targeted message based on and comprising a particular game outcome from a playing history of the player associated with the player identifier on the display device, the targeted message being determined using said particular game outcome, the particular game outcome having occurred to the player before the ticket was dispensed from the ticket dispenser; and e) dispense a cash amount using the electronic ticket record.

2. The system as recited in claim 1, wherein the ticket redemption machine is further configured to dispense a physical coupon along with the cash amount, the coupon selected based on information the casino has on the player identified by the player identifier.

3. The system as recited in claim 1, wherein the targeted message comprises a bonus offer to the player.

4. The system as recited in claim 3, wherein the ticket redemption machine is further configured to: allow the player to accept or reject the bonus offer; if the player rejects the bonus offer, dispense cash; and if the player accepts the bonus offer, dispense a new promotional ticket.

5. The system as recited in claim 4, wherein the new promotional ticket has a cash value with a condition attached, the ticket not redeemable until the condition is met.

6. The system as recited in claim 4, wherein the new promotional ticket has a first cash value and a second value with a condition attached, the second value being cashable only after the condition is met.

7. The system as recited in claim 1, wherein the targeted message comprises an offer for sale of an item.

8. The system as recited in claim 7, wherein the item is selected using a player's profile of the player.

9. The system as recited in claim 8, wherein the item is selected using a player's sex of the player.

10. The system as recited in claim 8, wherein the item is selected using a player's age of the player.

11. A system to display a targeted message to a player, comprising:

a slot machine associated with a card reader and a ticket dispenser, configured to a) receive a loyalty card in the card reader and enable an identification of a player associated with the loyalty card; b) enable play of the slot machine by the player; c) enable electronic recordation of a plurality of game outcomes presented on the slot machine; d) receive a cashout request from the player and generate in an electronic database an electronic ticket record for a ticket; e) dispense from the ticket dispenser the ticket associated with the ticket record; and a ticket redemption machine and a display device, configured to a) receive the ticket from the player, b) identify from the electronic database the electronic ticket record associated with the ticket, c) retrieve a particular game outcome out of the plurality of game outcomes, d) display on the display device a targeted message based on said particular game outcome which includes said particular game outcome that occurred to the player on the slot machine before the ticket was dispensed from the ticket dispenser, e) dispense a cash amount.

* * * * *